United States Patent [19]

Amberg

[11] 4,295,580
[45] Oct. 20, 1981

[54] CLOSURE DISPENSER

[75] Inventor: Christopher P. Amberg, Toledo, Ohio

[73] Assignee: Owens-Illinois, Inc., Toledo, Ohio

[21] Appl. No.: 66,942

[22] Filed: Aug. 16, 1979

[51] Int. Cl.³ ............................................. B65G 59/06
[52] U.S. Cl. ................................................... 221/268
[58] Field of Search ........................ 221/268, 276, 271

[56] References Cited

U.S. PATENT DOCUMENTS

| | | | |
|---|---|---|---|
| 1,057,158 | 3/1913 | Lynch et al. | 221/276 X |
| 1,170,705 | 2/1916 | Swift | 221/276 X |
| 2,851,192 | 9/1958 | Mayo et al. | 221/276 X |
| 2,946,482 | 7/1960 | Johnson | 221/268 X |
| 3,412,895 | 11/1968 | Hilton | 221/268 X |

Primary Examiner—Robert J. Spar
Assistant Examiner—Frederick R. Handren
Attorney, Agent, or Firm—David R. Birchall; Myron E. Click; David H. Wilson

[57] ABSTRACT

A mechanism for dispensing container closures, one at a time, from a stacked array. A hand operated slide bar is positioned at the bottom of the closure stack. An upturned edge or finger is attached to the slide bar, thus enabling it to engage with the inside rim area of the closure and pull the closure from the stack. The finger on the slide bar is beveled so that it will slide beneath the container rim when the slide is returned to its inward position.

1 Claim, 2 Drawing Figures

CLOSURE DISPENSER

BACKGROUND OF THE INVENTION

Closures also known as caps and lids are used with a wide variety of containers. The closures vary greatly with respect to geometry and the materials of which they are manufactured. One well known closure is used as a temporary cover for beverage containers associated with the fast food industry. The beverages, either hot or cold, are dispensed into a paper or plastic cup and then transported for a short distance before the beverage is consumed. The closures used with hand held beverages are generally thermoformed of relatively thin flexible plastic material, such as for example, polystyrene or polyethylene.

Since the beverage containers are fragile in nature, they cannot withstand direct axial loading of any great magnitude. Consequently, the closure structure, including the lip thereof, is quite flexible, thus facilitating installation of the closure over and around the container bead. The closures have incorporated into the peripheral lip a locking mechanism that snaps into engagement with the container rim.

The closures manufactured for hot and cold beverage cups are extremely light in weight and have a tendency to stick together when stacked. To prevent the nested closures from sticking together when assembled in a stack, the top of the closure is modified from its generally planar configuration and includes indentations strategically positioned to prevent tight nesting. In many instances the denesting features are so pronounced so as to permit one closure to slide freely over the top of another without any interference from the downwardly protruding rim.

Thus it becomes apparent that if the closures are designed so that they do not nest, there will be little if any lateral stability when the closures are stacked one upon another. Various racks have been designed to accommodate and make available closures in areas where soft drinks, coffee and other beverages are sold. The existing racks necessitate removal of the closures by grasping the closure with the fingers. Invariably more than one closure is touched in the process of removing the desired closure.

DESCRIPTION OF THE PRIOR ART

The prior art has shown dispensing devices such as that described in U.S. Pat. No. 1,723,232. This particular dispensing device employs a pull slide that facilitates in the ejection of a flat folded paper cup. The handling of flat envelope-like paper cups is markedly different than handling plastic closures. The flat paper cup provides a generally planar surface upon which the next most immediate adjacent paper cup can slide. Whereas with closures that contain not only a downwardly protruding rim but also protruding antinesting features, the desirable planar sliding surface is not as well defined as in the prior art paper cup. The present invention provides a more positive ejection means than that shown and described in the prior art.

The primary object of the present invention is to provide a dispenser for closures that will eject one closure at a time without undue handling of the closure.

Another object of the present invention is to provide a closure dispenser that will not break or fracture the closures as they are withdrawn from the dispenser.

A further object of this invention is to provide an ejection mechanism that coacts with the interior surface of the closure and transports the closure from within the stacked array of closures.

Yet another object of the present invention is to dispense closures without undue handling by the user.

SUMMARY OF THE INVENTION

This invention relates to a closure dispensing apparatus. More particularly, the invention sets forth an apparatus for dispensing very frangible closures manufactured of paper or plastics. The apparatus accommodates a stack of closures such as those utilized in the fast food industry. Particularly, the apparatus of this invention facilitates in dispensing one closure at a time without tearing or breaking the closure. The closures thus dispensed are quite susceptible to breakage since they are designed for a temporary dust or splash preventing cover. The cover is forced over the bead of the container, remains in position for a short interval, is removed and discarded at or subsequent to the consuming of the beverage held within the container. The apparatus of this invention not only provides a storage facility for a stack of closures, but also, provides a manually operated slide eject mechanism for removing one closure at a time from the bottom of the stack of closures held within the apparatus. The eject mechanism provides a lateral force on the interior rim of the closure.

DETAILED DESCRIPTION OF THE INVENTION

Figure 1:
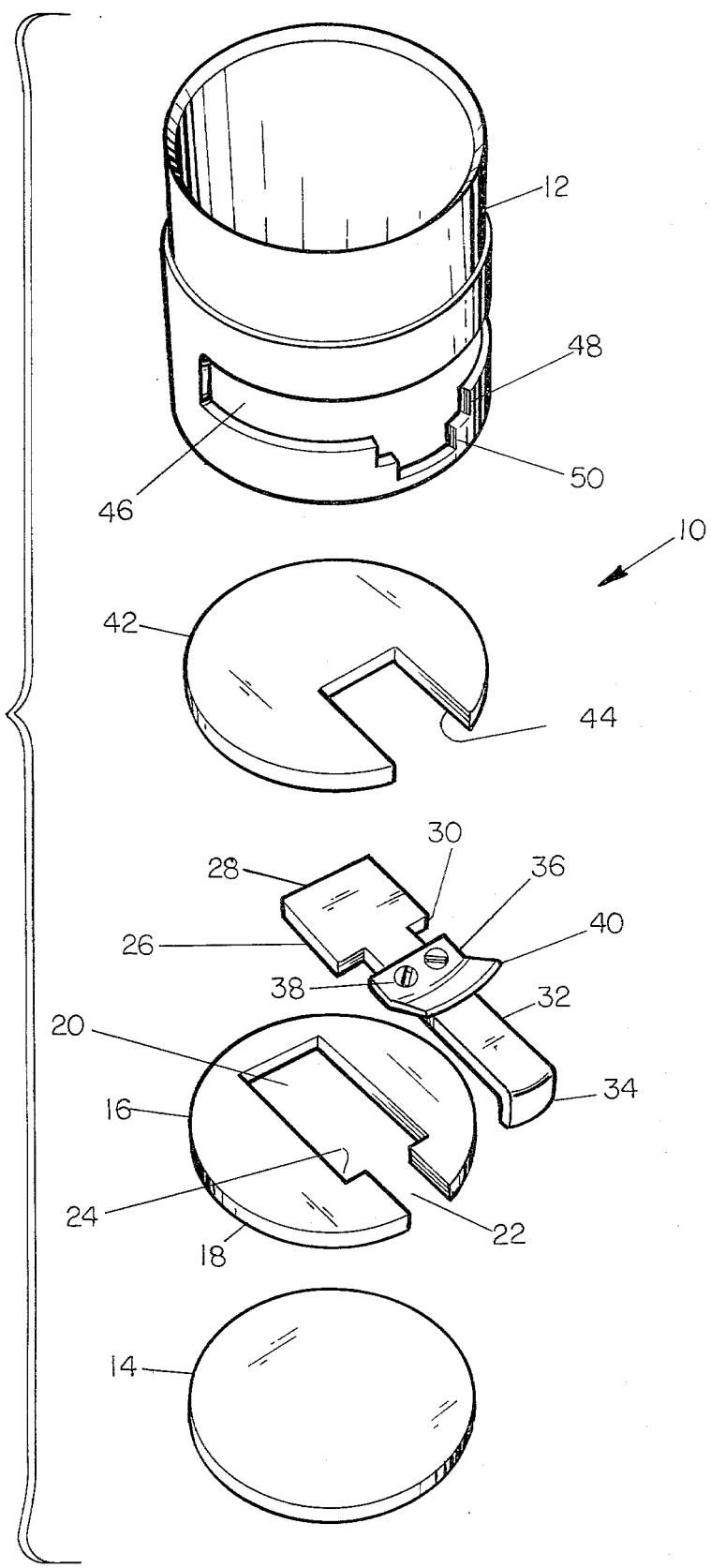
FIG. 1 is a perspective view with the parts of the apparatus in spaced apart relationship with one another.

The overall apparatus is shown in FIG. 1 and is generally represented by numeral 10. The closures which are to be dispensed by the present invention are generally shipped in stacks where the closures are placed one on top of the other. This arrangement of stacking the closures lends itself to the closure retainer provided by the present invention. FIG. 1 depicts a cylindrical closure housing 12 of sufficient internal diameter to accommodate the closures without the closures becoming lodged therein. The closure housing or barrel can be of any reasonable height to handle from 10 to 100 closures. A cover (not shown) can be provided to fit over the top of closure housing 12, however, the cover is not essential to the present invention. The closure housing 12 is provided with a bottom end plate 14 that is attached to the bottom end of closure housing 12. The end plate 14 can be fabricated to fit within the internal diameter of closure housing 12 or if desired, it can butt against the bottom of closure housing 12.

A slide bar retaining plate 16 is tailored so that its generally cylindrical exterior edge 18 fits snugly into engagement with the internal wall of closure housing 12. Retaining plate 16 contains an elongated slide bar slot 20 positioned along one of its diameters. The slide bar slot 20 is rectangular in configuration and opens at one end to the exterior edge 18 by means of handle slot 22. The width of handle slot 22 is less than the width of adjacently connected slide bar slot 20. Thus there are provided reentrant corners 24 at the juncture between slots 20 and 22. The slide bar retaining plate 16 is positioned within closure housing 12 so that it abuts in flush engagement with the top surface of bottom end plate 14.

A slide bar 26 of elongate configuration is shown immediately above the slide bar retaining plate 16 in FIG. 1. Slide bar 26 contains a rearward section 28 generally rectangular in configuration. The width of rearward section 28 is slightly less that the width of the slide bar slot 20 of slide bar retaining plate 16. The forward edge of rearward section 28 contains exterior corners 30 which are adapted to coact with the reentrant corners 24 of slide bar retaining plate 16. The slide bar 26 contains a forward section 32 that terminates with a downwardly depending handle 34. The width of the forward section 32 is slightly less than the handle slot 22 which is provided in slide bar retaining plate 16.

As can be visualized from FIG. 1, the slide bar 26 is adapted to fit into slide bar slot 20 of slide bar retaining plate 16 and move in a linear fashion. Also, the overall thickness of slide bar 26 is less than the thickness of slide bar retaining plate 16. Since the forward section 32 of slide bar 26 is of less width than the rearward section 28, the slide bar 26 is limited in the extent over which it can travel. When the slide bar 26 is pulled forward it will travel freely until the exterior corners 30 engage the reentrant corners 24 of slide bar retaining plate 16. During the rearward travel of slide bar 26 it will be stopped by abutting against the back wall of slide bar slot 20. A closure engagement foot 36 is attached to the top surface of forward section 32 of slide bar 26. The attachment of engagement foot 36 is achieved by fasteners such as screws 38. The closure engagement foot 36 is positioned so that its upturned edge 40 is well within the internal diameter of closure housing 12 when slide bar 26 is in its rearwardmost position.

The slide bar 26 is held in position within slide bar slot 20 by means of cover plate 42. Cover plate 42 is generally circular in configuration and possesses the same diametrical dimensions as do plates 14 and 16

Cover plate 42 is positioned on top of slide bar retaining plate 16, thus restraining slide bar 26 from any appreciable up and down movement. Of course, as previously pointed out, slide bar 26 can slide in and out because its overall thickness is less than the thickness of slide bar retaining plate 16. The forward half of cover plate 42 contains a rectangular shaped aperture 44 which has a width that exceeds the width of the closure engagement foot 36. The upturned edge 40 of closure engagement foot 36 fits into the space provided by aperture 44 of cover plate 42.

Referring once again to the closure housing 12, it can be seen in the drawings that a circumferentially positioned slot 46 is located in the lower portion thereof. The slot 46 contains two additional openings 48 and 50 which are actually part of slot 46. The slot 48 provides additional room for the movement of upturned edge 40 of the closure engagement foot 36, and likewise, slot 50 provides for free in and out movement of the forward section 32 of slide bar 26. The slots 48 and 50 are each slightly wider than the respective parts which coact therewith. The slot 46 extends at least one half the circumferential distance around closure housing since closures which approximate the internal diameter of closure housing 12 must pass freely therethrough.

Figure 2:
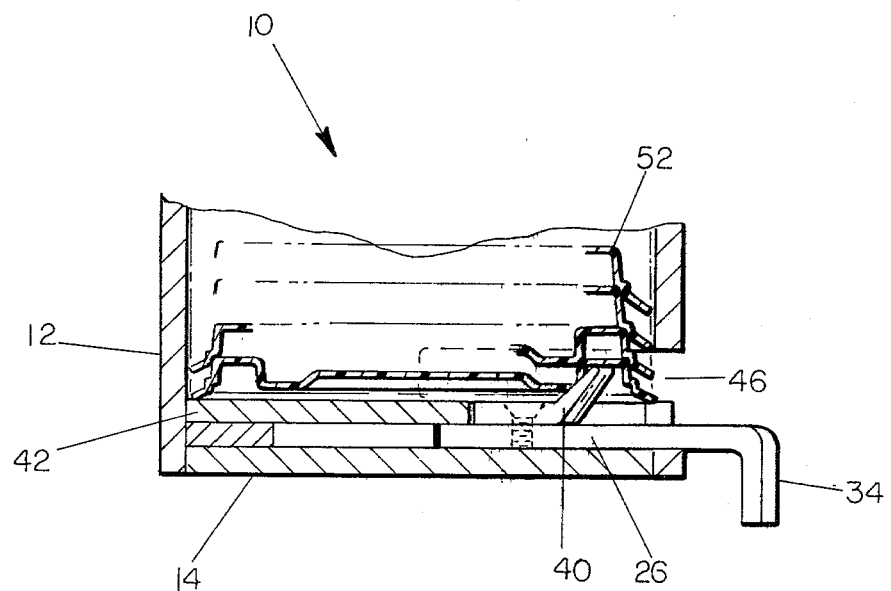
FIG. 2 is an elevational sectional side view showing the interaction between the apparatus and the closures it dispenses.

Referring now to FIG. 2 there is shown a side elevational view of the apparatus shown in FIG. 1. Also, shown in FIG. 2 are several closures 52 that are stacked one on top of the other and confined within the chamber provided by closure housing 12. The closures 52 contain stacking features which permit a well defined space between the rims of the respective closures. As can be seen in FIG. 2, the bottom closure 52 rests with its rim in contact with the top surface of cover plate 42.

During the operation of overall apparatus 10, handle 34 and attached slide bar 26 are in the inward position. The upturned edge 40 of closure engagement foot 36 rests against the inside rim of the bottom closure. As handle 34 is moved to an outward position, the bottom closure 52 will be disengaged from the stack of closures and will be partly withdrawn from the confinement of closure housing 12. The closure 52 moves through slot 46 and remains in a stable position because the front edge of the closure rim rests on the top surface of the forward section 32 of slide bar 26 and the rearward rim of the closure is supported by contact with the top surface of cover plate 42.

While the closure 52 is in the partly extracted position it becomes quite easy to grasp it with the fingers and completely remove it from overall apparatus 10.

After a closure 52 has been removed, the handle 34 is once again used to move slide bar 26 to its inward position. During the inward travel of slide bar 26, the upturned edge 40 of closure engagement foot 36 will contact the lower exterior rim of closure 52. Because of the camming effect of the inclined top surface of upturned edge 40, it will raise slightly the entire stack of closures and then pass beneath the closure rim and assume its position near the inside top of the rim, thus enabling another closure to be extracted at will.

It has become evident that the just described apparatus provides a simple positive means to store and dispense closures one at a time.

What is claimed is:

1. A dispenser for a flexible disk shaped closure with an attached rim, including an elongate cylindrically shaped closure storing chamber for storing a vertically oriented stack of closures, a bottom plate positioned adjacent one end of said storing chamber and attached thereto, a slide bar retaining plate positioned next to and in juxtaposed relationship with respect to said bottom plate, an elongated slot, formed with reentrant corners, positioned along a diameter of said slide bar retaining plate, a slide bar positioned and guided for movement within said slot, said movement being limited by engagement of said slide bar with said reentrant corners, a closure engagement foot attached to and positioned intermediate the ends of said slide bar, an upturned edge on said closure engagement foot cantilevered at an angle with respect to said slide bar for engaging the inside rim of a closure, a cover plate containing a slot-like aperture for surrounding a portion of said closure engagement foot, said cover plate positioned adjacent to and above said slide bar, a circumferentially positioned aperture in said storing chamber wall opposite said slot in said slide bar retaining plate, a notch formed in a bottom edge of said aperture for providing specific ingress and egress for said slide bar and its closure engagement foot, said slide bar passing through and movable within said notch so that when said slide bar is moved from an inward to an outward position a closure will be partially withdrawn from said dispenser through said aperture and when said slide bar is moved from an outward to an inward position said cantilevered upturned edge will cam beneath the rim of a closure positioned within said storing chamber and assume a position whereby the next closure can be extracted from said dispenser.

* * * * *